April 5, 1927.
G. F. ECKART
1,623,582
FLEXIBLE COUPLING
Filed Nov. 13, 1922  2 Sheets-Sheet 1
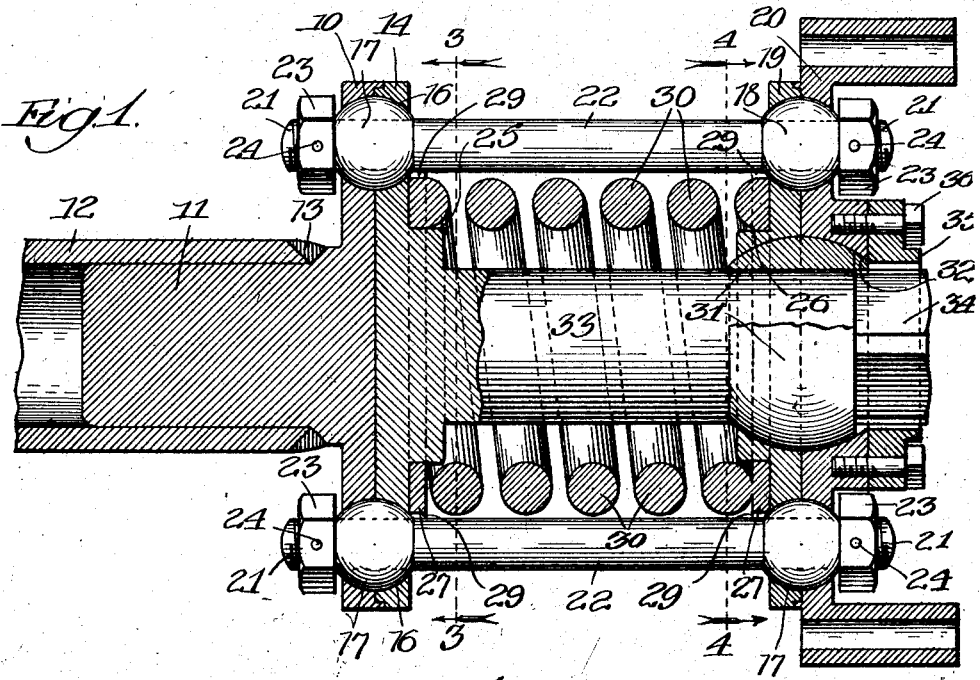
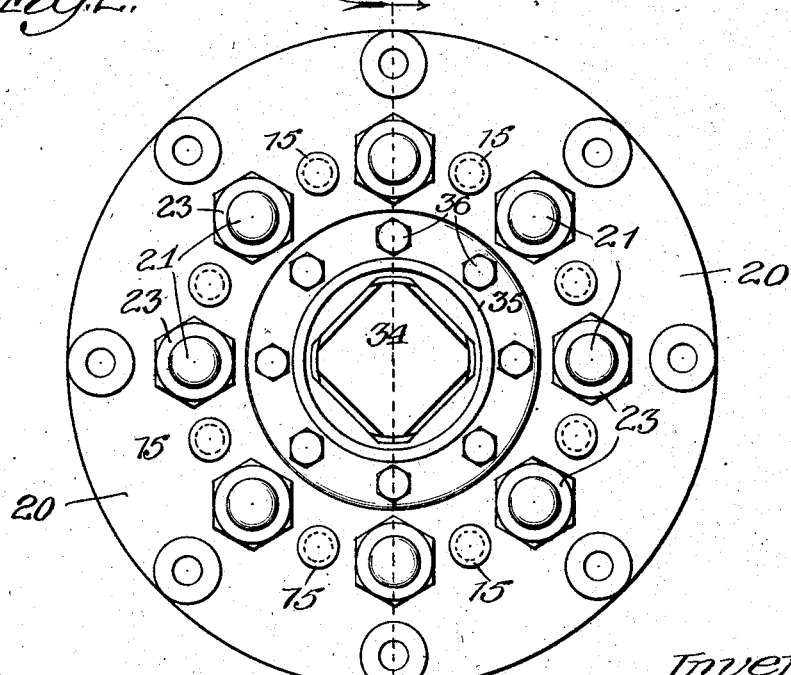
Inventor:
George F. Eckart,
By Dyrenforth, Lee, Chritton & Wiles
Attys.

April 5, 1927. 1,623,582
G. F. ECKART
FLEXIBLE COUPLING
Filed Nov. 13, 1922   2 Sheets-Sheet 2
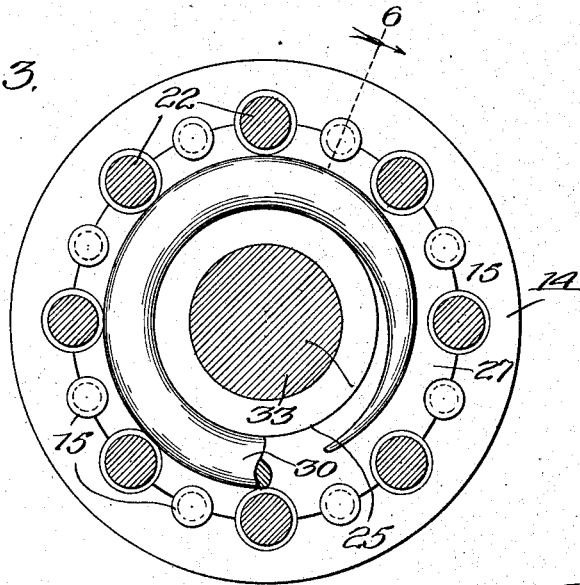
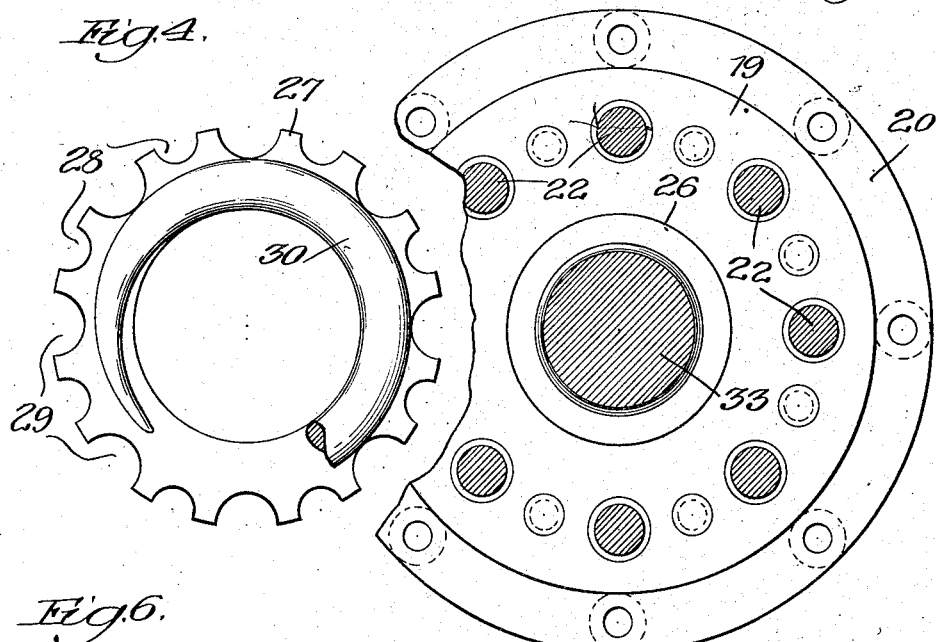
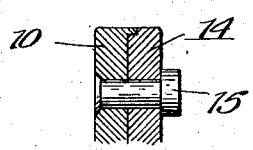
Inventor:
George F. Eckart Patented Apr. 5, 1927.

1,623,582

UNITED STATES PATENT OFFICE.

GEORGE F. ECKART, OF CINCINNATI, OHIO, ASSIGNOR, BY MESNE ASSIGNMENTS, TO JOHN M. ZANE, OF CHICAGO, ILLINOIS.

FLEXIBLE COUPLING.

Application filed November 13, 1922. Serial No. 600,690.

This invention relates to flexible couplings for motor vehicles and the like and is fully described in the following specification and shown in the accompanying drawings, in which Figure 1 is a longitudinal section through the coupling embodying the invention, Fig. 2 is an end elevation of the same, Fig. 3 is a transverse section on the line 3—3 of Fig. 1, Fig. 4 is a section on the line 4—4 of Fig. 1 showing the driving washer, Fig. 5 is also a section on the line 4—4 of Fig. 1 showing the driven end of the coupling with the driving washer removed, and Fig. 6 is a section on the line 6 of Fig. 3.

The embodiment, as illustrated, comprises a driving flange 10 which has a top 11 secured to a propeller shaft 12, or the like, by any suitable means, as by welding the annular groove 13. A corresponding plate 14 is secured to the face of the flange 10 by means of rivets 15. Spherical sockets 16 are spaced in a circle concentric to the axis of the propeller shaft 12 and balls 17 are mounted to turn therein. Similar balls 18 are mounted in the same way between a plate 19 and a flange 20, the plate and flange being secured together by means of similar rivets 15.

The balls 17 and 18 are drilled to receive the threaded ends 21 of pins or bolts 22, the balls being retained on the bolts by means of nuts 23, which are screwed upon the threaded ends of the pins and secured thereon by means of cotter pins 24 or the like.

Shoulders 25 and 26 are formed upon the plates 14 and 19 respectively, which serve to guide the driving washers 27, the circumferences of which are notched at 28 to fit the fillister head rivets 15. These washers are also notched at 29 to fit around the pins 22. A spring 30 is welded or otherwise secured to the driving washers 27 and its two ends are held under a high tension by the pins 22.

A hollow spherical member 31 is mounted to turn in a spherical opening 32, which is axially formed in the plate 19 and the flange 20. A stub shaft 33 is slidably mounted in the spherical member 31 and is axially secured to the flange 14 in alinement with the propeller shaft 12.

The reduced end 34 of the stub shaft 33 is squared and is loosely surrounded by a collar 35 having a squared opening, the latter being secured to the flange 20 by means of screws 36.

The operation of this flexible coupling is as follows; power is applied to the propeller shaft 12, which is transmitted through the fillister head rivets 15 to the spring 30 and thence through the fillister head rivets at the driven end to the driven flange 20.

As power is applied the spring 30 is slightly twisted, thereby throwing the pins or bolts 22 out of their normal alinement and subjecting the spring 30 to a still greater compression. A balance, however, between these forces is immediately reached, which is maintained as long as the given torsional stress is applied to the propeller shaft.

The stub shaft 33 tends to maintain the parts in alinement but will permit a slight movement which, however, is limited by the space between the squared end 34 and the collar 35. Moreover, if the torsional stress becomes too great, the squared end 34 will engage the squared opening in the collar 35, which will then drive the flange 20 directly through the cap screws 36.

This arrangement permits the shaft to yield somewhat under a sudden application of a torsional load, thereby preventing the machine to which it is applied from receiving the sudden shocks which are sometimes applied in motor vehicles and the like. At the same time, the stub shaft 33, while permitting a limited amount of movement between the axis of the propeller shaft 12 of the flange 20, prevents any violent whipping action to take place due to misalinement.

While I have shown and described but a single embodiment of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new and desire to secure by Letters Patent, is:

1. In a flexible coupling, a pair of opposing flanges, a series of members flexibly connecting said flanges, a compression spring holding said flanges outwardly against said members, a hollow spherical member mounted axially in one flange, and a shaft extending from the other flange and slidable in the hollow spherical member.

2. In a flexible coupling, a pair of opposing flanges, a series of members flexibly connecting said flanges, a compression spring holding said flanges outwardly against said members, a hollow spherical member mounted axially in one flange, a shaft extending from the other flange and slidable in the hollow spherical member, a squared end on said shaft and a squared opening in the flange in which it is slidable.

3. In a flexible coupling, a pair of opposing flanges, a series of hollow balls mounted in sockets in said flanges, bolts extending from one flange to the other and slidable in corresponding pairs of said balls, a compression spring holding said flanges outwardly against said bolts, a hollow spherical member mounted axially in one flange, and a shaft extending from the other flange and slidable in the hollow spherical member.

GEORGE F. ECKART.